United States Patent [19]

Chitarra et al.

[11] Patent Number: 5,665,436
[45] Date of Patent: Sep. 9, 1997

[54] METHOD OF TREATING GLASSES OF PLASTICS MATERIAL

[75] Inventors: Salvatore Chitarra, Antony; Daniel Teva, Gagny; Michel Pilache, Beauchamp, all of France

[73] Assignee: Valeo Vision, Bobigny Cedex, France

[21] Appl. No.: 307,509

[22] Filed: Oct. 11, 1994

[30] Foreign Application Priority Data

Sep. 17, 1993 [FR] France ................................ 93 11105

[51] Int. Cl.$^6$ ........................................................ B05D 3/06
[52] U.S. Cl. .................... 427/558; 427/164; 427/332; 427/595
[58] Field of Search ................... 427/558, 595, 427/164, 332; 428/412, 423.1

[56] References Cited

U.S. PATENT DOCUMENTS

| | | | |
|---|---|---|---|
| 4,010,374 | 3/1977 | Ramler | 250/492 R |
| 4,018,939 | 4/1977 | Merrill et al. | 427/54 |
| 4,879,176 | 11/1989 | Ouderkirk et al. | 428/323 |

FOREIGN PATENT DOCUMENTS

| | | |
|---|---|---|
| 0471079 | 8/1991 | European Pat. Off. . |
| 2313118 | 12/1976 | France . |
| 0513538 | 11/1992 | Germany . |

OTHER PUBLICATIONS

French Search Report 17 Jun. 1994.

Nov. 14, 1996 Memo from Christine Mann. Lighting Specialist, Lighting Information Center, GE Lighting NCSC, Virginia re: RSM Sun Lamp.

*Primary Examiner*—Bernard Pianalto
*Attorney, Agent, or Firm*—Morgan & Finnegan, LLP

[57] ABSTRACT

A lamp glass for a motor vehicle, such as a headlamp or indicating lamp glass, is of a plastics material such as polycarbonate, and is subjected to treatment with ultraviolet radiation before a protective coating is deposited on it.

5 Claims, No Drawings

METHOD OF TREATING GLASSES OF PLASTICS MATERIAL

FIELD OF THE INVENTION

The present invention relates to a method of treatment for rendering glasses of transparent plastics material suitable for use as, for example, a vehicle headlamp glass or other lamp glass, such as those designed for other illuminating or indicating lamps of a motor vehicle. The invention also relates to a glass such as a headlamp glass or indicating lamp glass for a vehicle, when treated by such a method.

BACKGROUND OF THE INVENTION

In the applications mentioned above, glasses made of transparent plastics material must be treated in such a way as to make them insensitive, or at the very least highly resistant, to various kinds of aggressive outside influences. Such influences include mechanical attack resulting from the collision of various kinds of solid particles with the glass. This gives rise to abrasion of the plastics material of the glass, which leads to degradation of its light transmitting qualities; it also leads to the creation of parasitic diffraction.

Detrimental outside influences also include chemical attack due to various factors which are capable of causing chemical reaction with the material of which the glass is made. Such chemical reactions may be caused, for example, by the humidity of the atmosphere, or by various kinds of atmospheric pollution, or by washing liquids, or by contact with oil or fuel. Chemical changes in the plastics material of the glass may also be caused by the effects of exposure to some kinds of radiation, such as ultraviolet radiation.

These chemical reactions have the result of altering the appearance of the glass, and also result in deterioration of its light transmitting capability.

In order to overcome the above mentioned drawbacks, it has previously been proposed to protect the glasses of plastics material by means of a protective coating. These protective coatings can be classified in two categories in accordance with the way in which they act.

The first of these categories consists of hard, abrasion-resistant, varnishes or lacquers, which form a transparent screen that protects the glass of plastics material against any mechanical and chemical attack. The lacquers in this category are in general terms made from organo-silicone or acrylic compounds, the resistance of which to abrasion and chemical attack is nearly as good as that of vitreous glass. However, these lacquers have the disadvantage that they have a different coefficient of expansion from that of the plastics material of the glass which they are intended to protect, so that it can be necessary to provide, between the lacquer and the plastics material of the glass itself, an intermediate layer which is capable of absorbing the mechanical stresses that can be produced during temperature variations—as is indeed the case with motor vehicle headlamp glasses.

The lacquers or varnishes in the second category are those known as self-healing lacquers, which have the ability to re-form, by themselves, a perfect surface after having been subjected to mechanical attack such as scratching. Protective coatings of self-healing lacquers are in general made from polyurethane based compositions. This is for example the case in the coating which is described in French published patent specification FR 2 677 657A, filed in the name of Valeo Vision, which includes a coating composition formed from a reticulated polyurethane-polyurea.

Nevertheless, it has been found that the adhesion of the protective coating on the plastics material of the glass was insufficient, in spite of the fact that such methods for treating the surface of the glass were used as corona, flame, and plasma microwave treatment, before the protective coating was deposited on the glass. This is found to give rise to rapid deterioration in the optical transmission characteristics of the glass, so making it unsuitable for its purpose.

DISCUSSION OF THE INVENTION

An object of the present invention is to provide a method which does not have the above mentioned drawbacks.

According to the invention in a first aspect, a method of treating a glass of transparent plastics material, and more particularly, of polycarbonate, is characterised in that it comprises subjecting the surface of the said glass to ultraviolet radiation before depositing a protecting coating on it.

It will be noted that the inventive step goes contrary to what has been strongly believed in the art up till now. In this connection, the person skilled in the art always does his or her best to protect the plastics material of a vehicle headlamp or indicating lamp glass from the action of ultraviolet radiation, which gives rise to yellowing of the latter. In this regard, reference is invited to the above mentioned French patent specification FR 2 677 655A, in which it was arranged that the coating should incorporate stabilising agents such as to protect the glass against ultraviolet radiation.

Tests carried out on polycarbonate glasses which have been subjected to surface treatment in accordance with the above mentioned known methods on the one hand, and to the method according to the present invention on the other, have shown that the method according to this invention enables the plastics material to be activated to a greater depth, with enhanced durability, so that after the surface treatment has been carried out, the adhesion of the protective coating then applied is improved.

In particular, the improved durability of the activation is an extremely important factor, having regard to the fact that the activating operation and the coating operation cannot be carried out simultaneously.

By selection of ultraviolet radiation emission sources having an emission spectrum in which the majority of the wavelengths are wavelengths greater than 280 nm, and in which, more particularly, more than 50% of the energy emitted preferably corresponds to wavelengths lying in the range between 280 and 380 nm, it has been possible to avoid any yellowing of the polycarbonate.

The ultraviolet radiation is preferably such that the energy received by the glass of plastics material lies in the range between 2 and 14 J/cm$^2$.

After the above mentioned surface treatment has been carried out, a protective coating, of the type such as those described earlier herein, is deposited on the glass. This preferably comprises a coating of the kind disclosed in French patent specification FR 2 677 655A.

According to the invention in a second aspect, a glass of plastics material, which may in particular be a headlamp or indicating lamp glass for a vehicle, is characterised in that it has been subjected to treatment by the method according to the invention in its first aspect, and in that it includes a protective coating.

The material of the glass is preferably polycarbonate.

Further features and advantages of the invention will appear more clearly on a reading of the description that follows, of one embodiment of the invention.

DESCRIPTION OF A PREFERRED EMBODIMENT OF THE INVENTION

Motor vehicle headlamp glasses, moulded in transparent polycarbonate of the type sold commercially under the reference "LEXAN LS2/111" by the GEP Company, are placed on a conveyor belt in such a way that that face of each glass that is to be the external face of a headlamp is accessible to an applied light radiation. The conveyor belt is arranged to pass through a treatment tunnel by passing through an entry screen and then, on leaving the tunnel, an exit screen. The interior of the tunnel is equipped with a battery of lamps of the mercury type doped with halides, and in particular iron and cobalt halides.

Such lamps, which emit ultraviolet radiation, are sold commercially under the reference "D" by the FUSION UV CURING-SYSTEMS Company. They are selected more particularly by virtue of their emission spectrum. The wavelengths emitted are less rich in the region of 280 nm, and 50% of the energy emitted by the type of lamp selected lies in the region of ultraviolet radiation of the UVA and UVB type between 280 and 380 nm.

These particular lamps have the additional advantage that they emit very little infrared radiation, and, as a result, they give rise to no significant heating of the products exposed to them.

Preferably the lamps employed are lamps not having electrodes, in which illumination is achieved by subjecting the lamps to the action of microwaves generated by a magnetron arranged outside the tunnel. Waveguides arranged in an appropriate way channel the microwaves from the magnetron, and distribute them by focussing them on the lamps. In this connection, the lamps are arranged at the focus of an elliptical reflector which, in addition, enables the ultraviolet radiation emitted by each lamp to be suitably oriented. By regulating the orientation of each reflector individually, an appropriate distribution of the energy emitted towards the glasses under treatment can be obtained.

The tunnel and its entry and exit screens are so adapted as to prevent any leakage of microwave and ultraviolet radiation outside the tunnel.

The number of lamps illuminated, the orientation of the reflectors, the intensity of the ultraviolet radiation and the speed of the conveyor belt are regulated in such a way that the energy received by the glasses is preferably in the range between 2 and 14 $J/cm^2$; the speed of the conveyor belt can in particular vary between 2 and 4.8 m/mn.

At the exit of the tunnel, after passing through the exit screen, the glasses are recovered so as to be coated with a protective layer, such as for example a reticulated polyurethane-polyurea as disclosed in French published patent specification FR 2 677 657A.

In order to test the performance of glasses treated by the method provided by the present invention, samples were taken at the tunnel exit and various measurements were carried out.

First, the surface tension was measured so as to compare it firstly with that of untreated polycarbonate, and secondly with that of polycarbonate treated by a conventional method (such as corona, flame or plasma microwave treatment).

The results are as follows:

| Polycarbonate | Surface tension dynes/cm |
| --- | --- |
| untreated | 40 |
| conventional treatment | 42 |
| treatment according to this invention | 54 |

A very significant increase in the surface tension was found to have occurred after treatment in accordance with the invention.

It is appropriate to note that the adhesion of a protective coating is increased in strength and hardness, the greater is the surface tension of the coating layer. This demonstrates the advantages of the invention with respect to the current state of the art.

Measurements of the degree of yellowing were carried out on samples taken at the tunnel exit. A comparison with corresponding values obtained from the untreated polycarbonate samples showed no detectable alteration in the material treated in accordance with this invention. The optical performance of the material is thus preserved, contrary to all expectations.

It has also been found—and this is another important advantage in the method according to the present invention—that this method does not alter the mechanical properties of the treated material, again contrary to previously known methods which were particularly severe. Thus, it has been possible to compare samples of untreated and uncoated polycarbonate samples (A), with samples treated by the method in accordance with the invention (B), and with samples of a reticulated polyurethane-polyurea composition (C).

Tensile tests carried out on an "INSTRON 4301" machine, on test pieces measuring 150 mm×20 mm×4 mm, have given the following results (mean readings):

|  | A | B | C |
| --- | --- | --- | --- |
| critical stress in MPa | 61 | 65 | 66 |
| critical elongation (%) | 6.5 | 7 | 8 |

Impact tests performed on an ADAMEL-LHOMARGY 1342 machine (a "Charpy" testing machine) on test pieces measuring 60 mm×20 mm×4 mm, produced the following results (mean readings):

|  | A | B | C |
| --- | --- | --- | --- |
| stress in $kJ/m^2$ | 129 | 127 | 129 |

This shows that the mechanical properties of the material of which the headlamp glasses are made are not altered by using the treatment method in accordance with this invention. These properties are retained even after the glass has been coated with a layer of protective material. It has also been possible to show that treatment in accordance with the invention would enable the plastics material to be activated more deeply, giving improved durability.

The invention is not limited to the treatment of polycarbonate glasses. It is in particular applicable also to the treatment of polymethyl methacrylate glasses.

What is claimed is:

1. A method for treating glasses of transparent plastics material, comprising the steps of subjecting the surface of each glass to ultraviolet radiation emitted by electrodeless lamps, subsequently depositing a protective coating thereon, further including the steps of placing the glasses on a conveyor belt, moving the belt and glasses placed thereon through a tunnel, via: an entry screen; the interior of the tunnel; and an exit screen, the tunnel having disposed therein the battery of electrodeless lamps, subjecting the battery of electrodeless lamps to the action of microwaves generated by a magnetron outside of the tunnel, the lamps emitting ultraviolet radiation in response thereto.

2. A method according to claim 1, wherein the said glasses are of polycarbonate.

3. A method according to claim 1, wherein the said step of passing the conveyor belt through the tunnel comprises passing it through a tunnel in which the said lamps are disposed at the focus of an elliptical reflector.

4. A method according to claim 1, wherein more than 50% of the energy emitted corresponds to wavelengths in the range between 280 and 380 nm.

5. A method according to claim 1, including the further step of regulating: the number of lamps energized; the orientation of reflectors; the intensity of ultraviolet radiation; and a speed of the conveyor belt, to enable the energy received by said glasses to be in the range between 2 and 14 $J/cm^2$.

* * * * *